(12) United States Patent
Bielis, IV et al.

(10) Patent No.: US 8,851,245 B2
(45) Date of Patent: Oct. 7, 2014

(54) BRAKE ROTOR

(75) Inventors: George J. Bielis, IV, Ringwood, IL (US); Richard J. Woodside, Lake Geneva, WI (US); William V. Roberts, Crystal Lake, IL (US)

(73) Assignee: Brake Parts Inc LLC, McHenry, IL (US)

( * ) Notice: Subject to any disclaimer, the term of this patent is extended or adjusted under 35 U.S.C. 154(b) by 0 days.

(21) Appl. No.: 12/959,740

(22) Filed: Dec. 3, 2010

(65) Prior Publication Data
US 2012/0138397 A1 Jun. 7, 2012

(51) Int. Cl.
*F16D 65/12* (2006.01)
*F16D 69/00* (2006.01)

(52) U.S. Cl.
CPC ........ *F16D 65/127* (2013.01); *F16D 2069/004* (2013.01)
USPC .................................................. 188/218 XL

(58) Field of Classification Search
CPC ........................... F16D 65/12; F16D 2069/004
USPC ........................................ 188/77 W, 218 XL
See application file for complete search history.

(56) References Cited

U.S. PATENT DOCUMENTS

| | | |
|---|---|---|
| 1,898,978 A | 2/1933 | Lane |
| 2,180,086 A | 11/1939 | Kraft |
| 2,743,792 A | 5/1956 | Kansom |
| 2,835,355 A | 5/1958 | Armstrong |
| 2,850,118 A | 9/1958 | Byers |
| 3,301,356 A | 1/1967 | Pompa |
| 3,425,524 A | 2/1969 | Dewar |
| 3,809,192 A | 5/1974 | Stehle |
| 4,022,298 A | 5/1977 | Malinowski |
| 4,260,047 A | 4/1981 | Nels |
| 4,286,694 A | 9/1981 | Wiseman, Jr. et al. |
| 4,501,346 A * | 2/1985 | Bogenschutz .......... 188/218 XL |
| 4,913,267 A | 4/1990 | Campbell et al. |
| 4,995,500 A * | 2/1991 | Payvar ..................... 192/107 R |
| 5,101,953 A | 4/1992 | Payvar |
| 5,176,236 A * | 1/1993 | Ghidorzi et al. .......... 192/107 R |
| 5,207,305 A | 5/1993 | Iverson |
| 5,335,765 A | 8/1994 | Takakura et al. |
| 5,474,161 A | 12/1995 | Eaton, III et al. |
| 5,480,007 A | 1/1996 | Hartford |
| 5,501,306 A * | 3/1996 | Martino ................ 188/218 XL |

(Continued)

FOREIGN PATENT DOCUMENTS

| | | |
|---|---|---|
| DE | 2308256 A1 | 9/1974 |
| DE | 2458048 A1 | 6/1976 |

(Continued)

OTHER PUBLICATIONS

Alcon Corporation Limited Ventilated Disc 0328×42.

(Continued)

*Primary Examiner* — Vishal Sahni
(74) *Attorney, Agent, or Firm* — Winston & Strawn LLP (57) ABSTRACT

A brake rotor including a rotor support; and a braking band disposed on and encircling the rotor support. The braking band has first and second brake pad receiving surfaces on opposite sides of the braking band. At least one brake pad receiving surface defines at least one groove that has a groove path extending along and having a variable depth with respect to the at least one brake pad receiving surface.

34 Claims, 5 Drawing Sheets

(56) References Cited

U.S. PATENT DOCUMENTS

| | | | |
|---|---|---|---|
| 5,544,726 A | 8/1996 | Topouzian et al. | |
| 5,566,802 A | 10/1996 | Kirkwood | |
| 5,620,791 A * | 4/1997 | Dwivedi et al. | 428/323 |
| 5,626,211 A | 5/1997 | Gewelber et al. | |
| D381,609 S | 7/1997 | Ohata et al. | |
| 5,655,637 A | 8/1997 | Hays | |
| 5,662,192 A | 9/1997 | Kingston et al. | |
| 5,671,835 A | 9/1997 | Tanaka et al. | |
| 5,735,366 A | 4/1998 | Suga et al. | |
| 5,765,667 A | 6/1998 | Ross et al. | |
| 5,819,888 A | 10/1998 | Tamura et al. | |
| 5,850,895 A | 12/1998 | Evrard | |
| 6,131,707 A | 10/2000 | Buechel et al. | |
| 6,186,293 B1 | 2/2001 | Beer et al. | |
| 6,273,223 B1 | 8/2001 | Aloy | |
| 6,279,697 B1 | 8/2001 | Dickerson et al. | |
| 6,279,698 B1 | 8/2001 | Oberti | |
| 6,283,258 B1 | 9/2001 | Chen et al. | |
| 6,293,382 B1 | 9/2001 | Nishide et al. | |
| 6,325,186 B1 | 12/2001 | Don et al. | |
| 6,347,691 B1 | 2/2002 | Aydt | |
| D456,326 S | 4/2002 | York | |
| D458,198 S | 6/2002 | Oberti | |
| D458,567 S | 6/2002 | Oberti | |
| D458,882 S | 6/2002 | Oberti | |
| D459,282 S | 6/2002 | Oberti | |
| 6,446,770 B2 * | 9/2002 | Qian et al. | 188/218 XL |
| 6,457,566 B1 | 10/2002 | Toby | |
| D471,140 S | 3/2003 | Oberti | |
| 6,578,678 B2 | 6/2003 | Lee | |
| 6,729,445 B1 | 5/2004 | Qian et al. | |
| 6,767,884 B2 | 7/2004 | Lentsch et al. | |
| D497,127 S | 10/2004 | Veneziano et al. | |
| D508,666 S | 8/2005 | Cornolti et al. | |
| D508,882 S | 8/2005 | Cornolti et al. | |
| D509,173 S | 9/2005 | Cornolti et al. | |
| 6,957,725 B2 | 10/2005 | Runels | |
| D512,353 S | 12/2005 | Aloy | |
| 6,971,490 B2 | 12/2005 | Lin | |
| 6,997,292 B2 | 2/2006 | Burgoon et al. | |
| 7,066,306 B2 * | 6/2006 | Gavin | 188/218 XL |
| 7,077,247 B2 | 7/2006 | Burgoon et al. | |
| 7,097,006 B2 * | 8/2006 | Veneziano et al. | 188/218 XL |
| 7,097,007 B2 | 8/2006 | Lin | |
| 7,097,010 B1 * | 8/2006 | Hulten et al. | 188/264 AA |
| 7,159,698 B2 | 1/2007 | Banks et al. | |
| 7,219,777 B2 | 5/2007 | Lin | |
| 7,278,521 B2 | 10/2007 | Idei et al. | |
| 7,284,643 B1 | 10/2007 | Kao | |
| D557,187 S | 12/2007 | Johnson et al. | |
| 7,467,694 B2 | 12/2008 | Botsch | |
| 7,552,805 B2 | 6/2009 | Greppi et al. | |
| 2002/0139622 A1 | 10/2002 | Chen | |
| 2002/0153213 A1 * | 10/2002 | Gruber et al. | 188/218 XL |
| 2003/0034213 A1 | 2/2003 | Qian et al. | |
| 2004/0084261 A1 * | 5/2004 | Burgoon et al. | 188/218 XL |
| 2004/0140166 A1 | 7/2004 | Brown et al. | |
| 2005/0056495 A1 | 3/2005 | Greppi | |
| 2005/0126869 A1 | 6/2005 | Yeh | |
| 2005/0252739 A1 | 11/2005 | Callahan et al. | |
| 2007/0029146 A1 | 2/2007 | Huang | |
| 2007/0181390 A1 | 8/2007 | Korm | |
| 2008/0041675 A1 | 2/2008 | Baumgartner et al. | |
| 2008/0067018 A1 | 3/2008 | Smith et al. | |
| 2008/0142319 A1 | 6/2008 | Manter | |
| 2008/0302616 A1 | 12/2008 | Kao | |
| 2009/0095582 A1 | 4/2009 | Waninger | |
| 2009/0266653 A1 | 10/2009 | Antanaitis et al. | |

FOREIGN PATENT DOCUMENTS

| | | |
|---|---|---|
| DE | 3410127 A1 | 10/1985 |
| DE | 4002695 A1 | 8/1991 |
| DE | 4336094 A1 | 4/1995 |
| DE | 29704133 U1 | 8/1998 |
| DE | 10355104 A1 | 6/2005 |
| EP | 0670434 A1 | 9/1995 |
| EP | 0902209 * | 3/1999 |
| EP | 1048874 A1 | 11/2000 |
| EP | 1063442 A2 | 12/2000 |
| GB | 998578 * | 7/1965 |
| WO | WO-0206694 A1 | 1/2002 |
| WO | WO-0206694 C2 | 1/2002 |
| WO | WO-2007103150 A2 | 9/2007 |

OTHER PUBLICATIONS

Alcon Corporation Limited Ventilated Disc 0327x37.

* cited by examiner

BRAKE ROTOR

TECHNICAL FIELD

This disclosure relates to brake rotors.

BACKGROUND

Disk brakes are commonly used for slowing or stopping the rotation of a wheel of a vehicle. Generally, a disk brake system includes a rotor connected to the wheel and/or an axle of the vehicle and a caliper. The caliper houses brake pads on opposite sides of the rotor and pistons that move the brake pads into frictional contact with the rotor to slow or stop rotation of the rotor. Usually rotors are made of cast iron or ceramic composites (including carbon, Kevlar and silica). In addition, the caliper is generally actuated hydraulically to move the pistons between braking and non-braking positions. Other methods of caliper actuation include mechanical linkage systems, pneumatics, and electromagnetism.

SUMMARY

One aspect of the disclosure provides a brake rotor including a rotor support (e.g., a mounting bell) and a braking band disposed on and encircling the rotor support. The braking band has first and second brake pad receiving surfaces on opposite sides of the braking band. At least one brake pad receiving surface defines at least one groove that has a groove path extending along and having a variable depth with respect to the at least one brake pad receiving surface.

Implementations of the disclosure may include one or more of the following features. In some implementations, the at least one brake pad receiving surface defines non-intersecting asymmetrical grooves arranged asymmetrically with respect to each other. In additional implementations, the at least one brake pad receiving surface defines groups of non-intersecting asymmetrical grooves. Each groove of the groove group has a groove path along the at least one brake pad receiving surface different from any other groove of the respective groove group. Each groove group can be arranged asymmetrically circumferentially about the at least one brake pad receiving surface.

In some examples, each groove group comprises first, second, and third grooves, each groove disposed in respective first, second, and third groove regions of the at least one brake pad receiving surface arranged circumferentially with respect to each other about a center axis of rotation defined by the brake rotor. Each groove region may have a radial width of about ⅓ of a radial width of the at least one brake pad receiving surface. Moreover, each groove group can be sized to reside completely with a perimeter of an engagement surface of a received brake pad.

In some implementations, each groove path has first and second radii of curvature for corresponding first and second curves along the at least one brake pad receiving surface. In some examples, the first and second radii of curvature are equal.

The first and second brake receiving surfaces may each have inner and outer diameters with respect to a center axis of rotation of the brake rotor. Each groove path may extend along the at least one brake pad receiving surface at a groove distance from the center axis greater than or equal to one half of the inner diameter of the brake receiving surface having the largest inner diameter among the two brake receiving surfaces, plus a clearance distance. In some examples, the clearance distance is about 0.18 inch and the rotor support has a height of less than or equal to 3 inches. The rotor support height is measured as the overall height of the brake rotor minus the overall thickness of the braking band. In other examples, the clearance distance is about 0.21 inch and the rotor support may have a height greater than 3 inches.

The groove distance, in some implementations, is equal to the greater of (a) one half of the inner diameter of one of the brake receiving surfaces, plus the clearance distance, and (b) a radius of the rotor support plus a threshold distance. The clearance distance may be about 0.18 inch, the threshold distance may be about 0.27 inch, and the rotor support may have a height of less than or equal to 3 inches, where the rotor support height measured as the overall height of the brake rotor minus the overall thickness of the braking band. In some examples, the clearance distance is about 0.21 inch, the threshold distance is about 0.35 inch, and the rotor support has a height greater than 3 inches.

Each groove path may extend along the at least one brake pad receiving surface at a threshold groove distance from the center axis greater than or equal to a radius of the rotor support plus a threshold distance. In some examples, the threshold distance is about 0.27 inch and the rotor support has a height of less than or equal to 3 inches. In additional examples, the threshold distance is about 0.35 inch and the rotor support has a height greater than 3 inches, where the rotor support height measured as the overall height of the brake rotor minus the overall thickness of the braking band. At least one groove may define a bull-nose shape in cross-section.

Another aspect of the disclosure provides a brake rotor that includes a rotor support and a braking band disposed on and encircling the rotor support. The braking band has first and second brake pad receiving surfaces on opposite sides of the braking band. At least one brake pad receiving surface defines groups of non-intersecting asymmetrical grooves. Each groove of each groove group has a groove path along the at least one brake pad receiving surface different from any other groove of the respective groove group and each groove of the respective groove group is arranged asymmetrically with respect to each other.

Implementations of the disclosure may include one or more of the following features. In some implementations, each groove group is arranged asymmetrically circumferentially about the at least one brake pad receiving surface. Each groove group may comprises first, second, and third grooves. Each groove is disposed in a respective first, second, and third groove region of the at least one brake pad receiving surface and arranged circumferentially with respect to each other about a center axis of rotation defined by the brake rotor. Each groove region may have a radial width of about ⅓ of a radial width of the at least one brake pad receiving surface. Moreover, each groove group can be sized to reside completely with a perimeter of an engagement surface of a received brake pad.

In some implementations, each groove path has first and second radii of curvature for corresponding first and second curves along the at least one brake pad receiving surface. The first and second radii of curvature may be equal.

The first and second brake receiving surfaces may each have inner and outer diameters with respect to a center axis of rotation of the brake rotor. Each groove path may extend along the at least one brake pad receiving surface at a groove distance from the center axis greater than or equal to one half of the inner diameter of the brake receiving surface having the largest inner diameter among the two brake receiving surfaces, plus a clearance distance.

In some examples, the clearance distance is about 0.18 inch and the rotor support has a height of less than or equal to 3 inches; while in other examples, the clearance distance is about 0.21 inch and the rotor support has a height greater than 3 inches. The rotor support height measured as the overall height of the brake rotor minus the overall thickness of the braking band.

The groove distance may be equal to the greater of (a) one half of the inner diameter of one of the brake receiving surfaces, plus the clearance distance, and (b) a radius of the rotor support plus a threshold distance. In some examples, the clearance distance is about 0.18 inch, the threshold distance is about 0.27 inch, and the rotor support has a height of less than or equal to 3 inches. In other examples, the clearance distance is about 0.21 inch, the threshold distance is about 0.35 inch, and the rotor support has a height greater than 3 inches.

In some implementations, each groove path extends along the at least one brake pad receiving surface at a threshold groove distance from the center axis greater than or equal to a radius of the rotor support plus a threshold distance. The threshold distance may be about 0.27 inch and the rotor support has a height of less than or equal to 3 inches. Alternatively, the threshold distance may be about 0.35 inch and the rotor support has a height greater than 3 inches. For each example, at least one groove may define a bull-nose shape in cross-section.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Referring to FIGS. 1-3B, a brake rotor 100 for a disc brake assembly 20 for a vehicle 10 includes a mounting bell 110 for connection to a vehicle wheel hub 30 and a braking band 120 disposed on and encircling the mounting bell 110. The braking band 120 has first and second brake pad receiving surfaces 130, 140 on opposite sides of the braking band 120 for cooperating with and receiving brake pads 22 of calipers 24 of the disc brake assembly 20. The calipers 24 move the brake pads 22 between a first position disengaged from the brake receiving surfaces 130, 140 of the brake rotor 100 and a second position engaged with the brake receiving surfaces 130, 140 of the brake rotor 100, in order to exert a braking action on the vehicle 10. At least one of the brake pad receiving surfaces 130, 140 defines at least one groove 150 that has a groove path 152 extending along the respective brake pad receiving surfaces 130, 140. In the examples shown, both brake pad receiving surfaces 130, 140 include grooves 150.

In general, brakes convert friction to heat; however brakes that get too hot cease to work due to a failure to dissipate enough heat. This condition of failure is known as brake fade. The grooves 150 help prevent or decrease the likelihood of brake fade. In addition, the grooves 150 enable removal or drainage of accumulated water or moisture off of the brake receiving surfaces 130, 140 of the braking band 120, thus decreasing the presence of water between the brake pads 22 and the brake rotor 100 during passage of the brake rotor 100 through the calipers 24. Enhanced braking action is achieved by draining the water and moisture, via the grooves 150, off of the brake receiving surfaces 130, 140.

Figure 1:
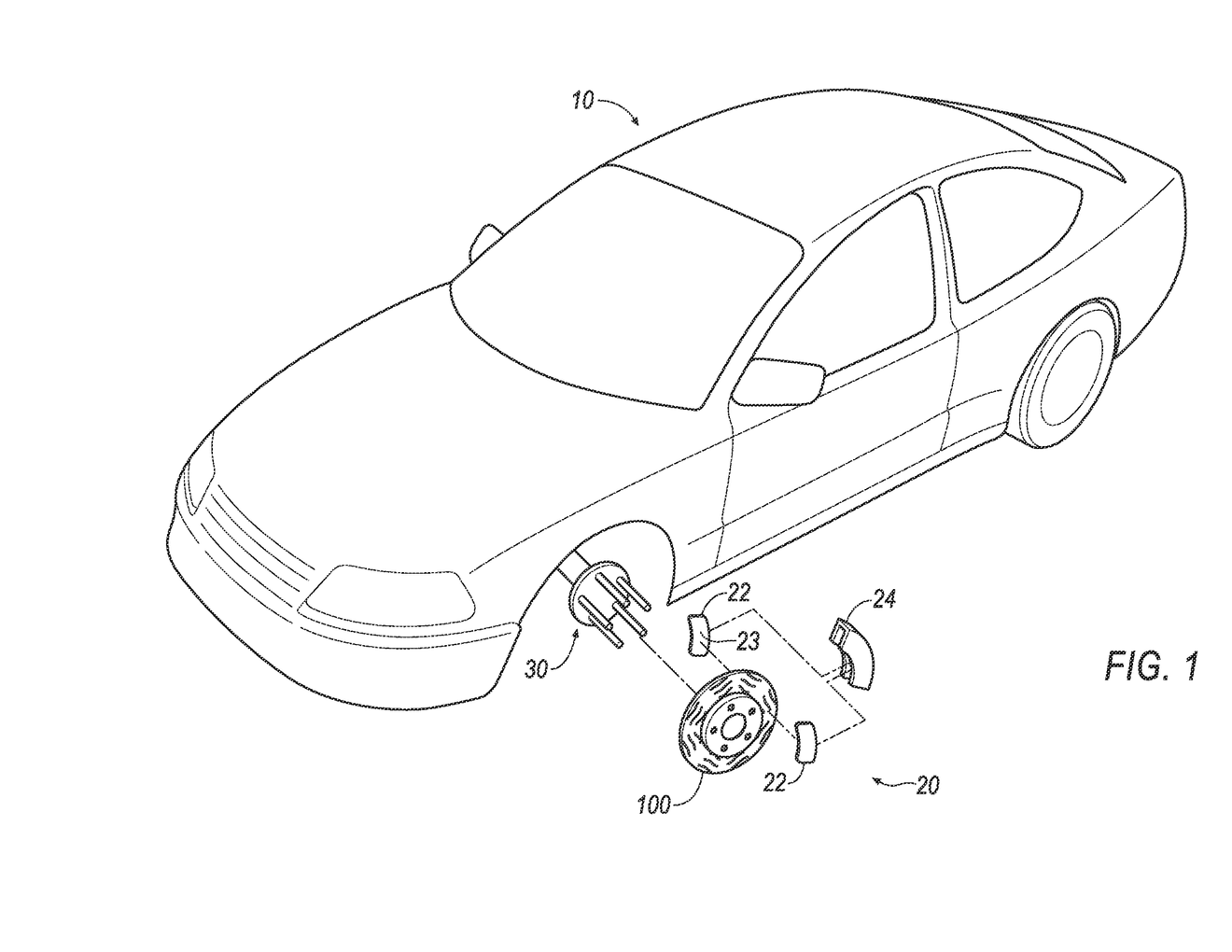
FIG. 1 is a partial perspective view of a vehicle with an exemplary disc brake assembly.
Figure 2A:
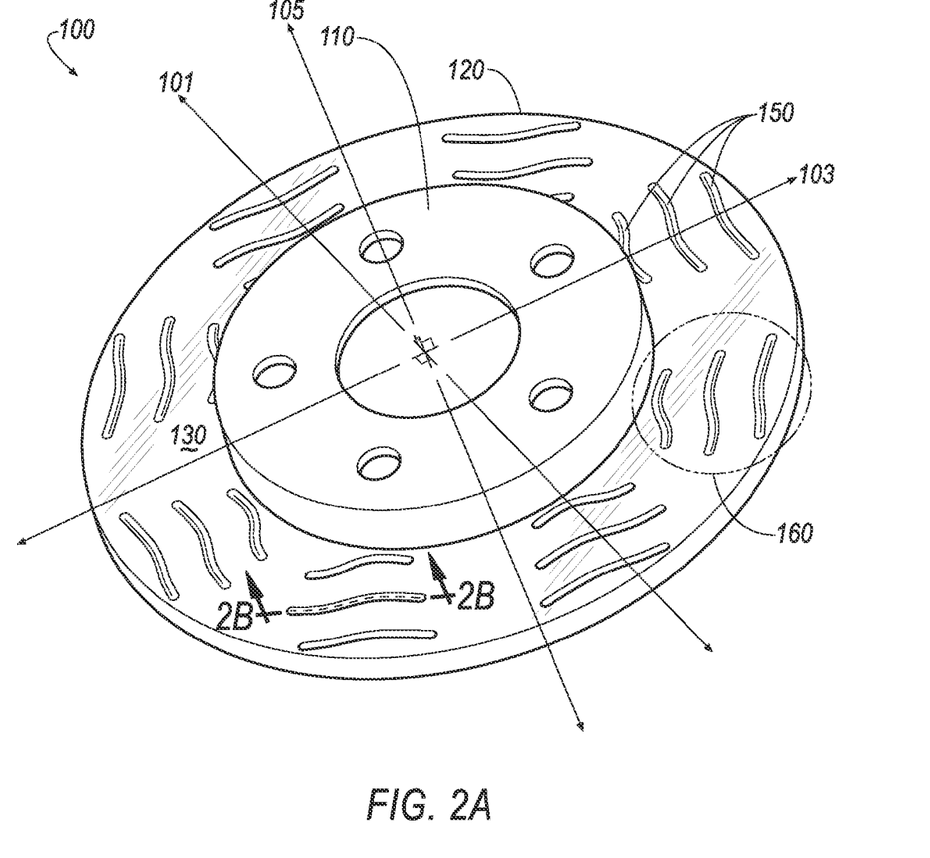
FIG. 2A is a top view of an exemplary brake rotor.
Figure 2B:
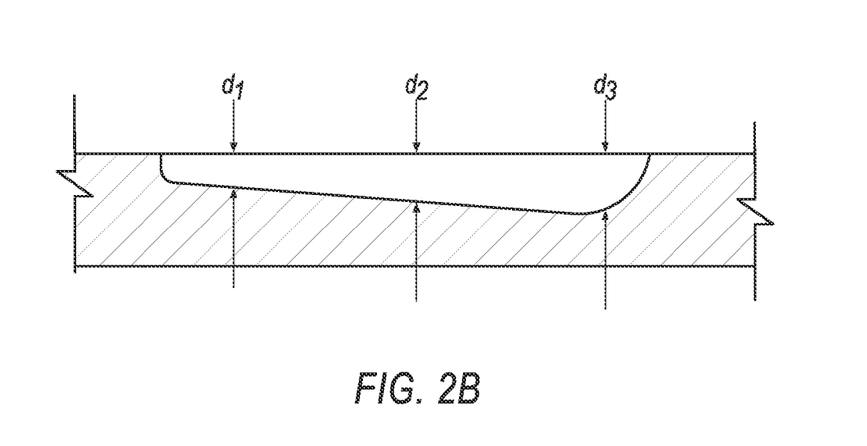
FIG. 2B is a section view of the brake rotor shown in FIG. 2A along line 2B-2B.

Referring to FIG. 2B, in some implementations, one or more grooves 150 have a variable depth $d_1, d_2, d_3$ with respect to the brake pad receiving surface 130, 140. Grooves 150 of variable depth provide full time out-gassing of friction volatiles and extended pad life (i.e., less pad wear over time) relative to rotors with constant depth grooves. In addition to extended wear life, the brake rotors 100 with variable depth grooves 150 facilitated relatively quicker vehicle stopping. Each groove 150 can define a particular cross-sectional shape, such as a bull-nose, rectangular, dovetail, trapezoid, etc.

Figure 3A:
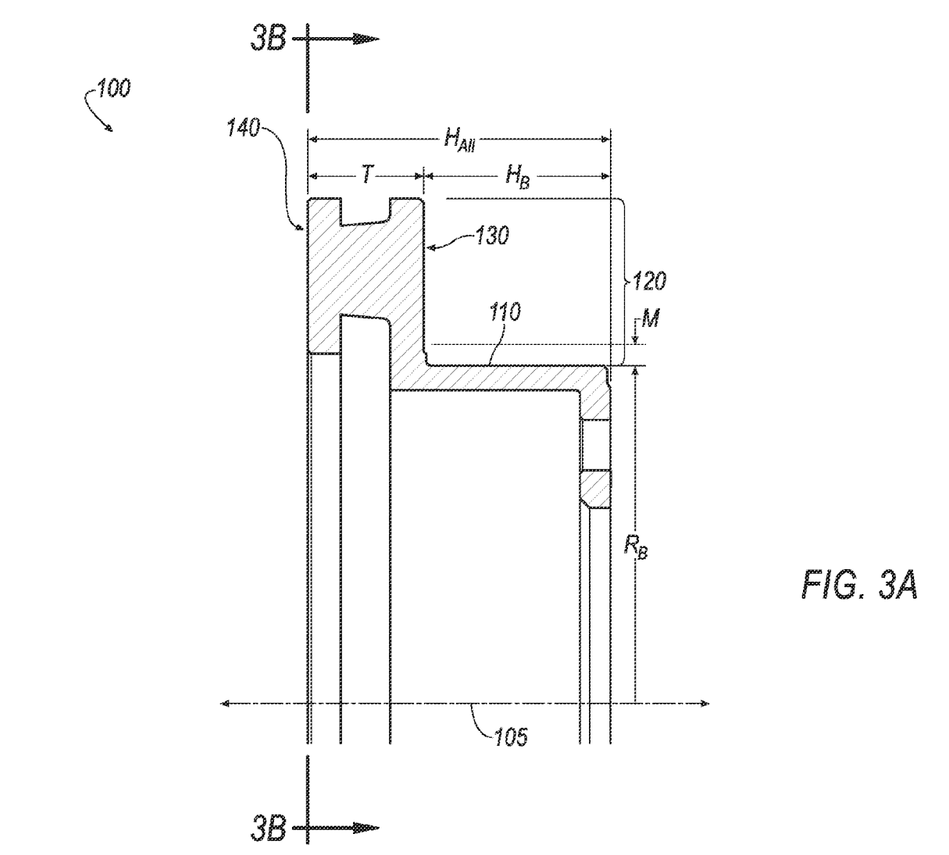
FIG. 3A is a partial sectional view of an exemplary brake rotor.
Figure 3B:
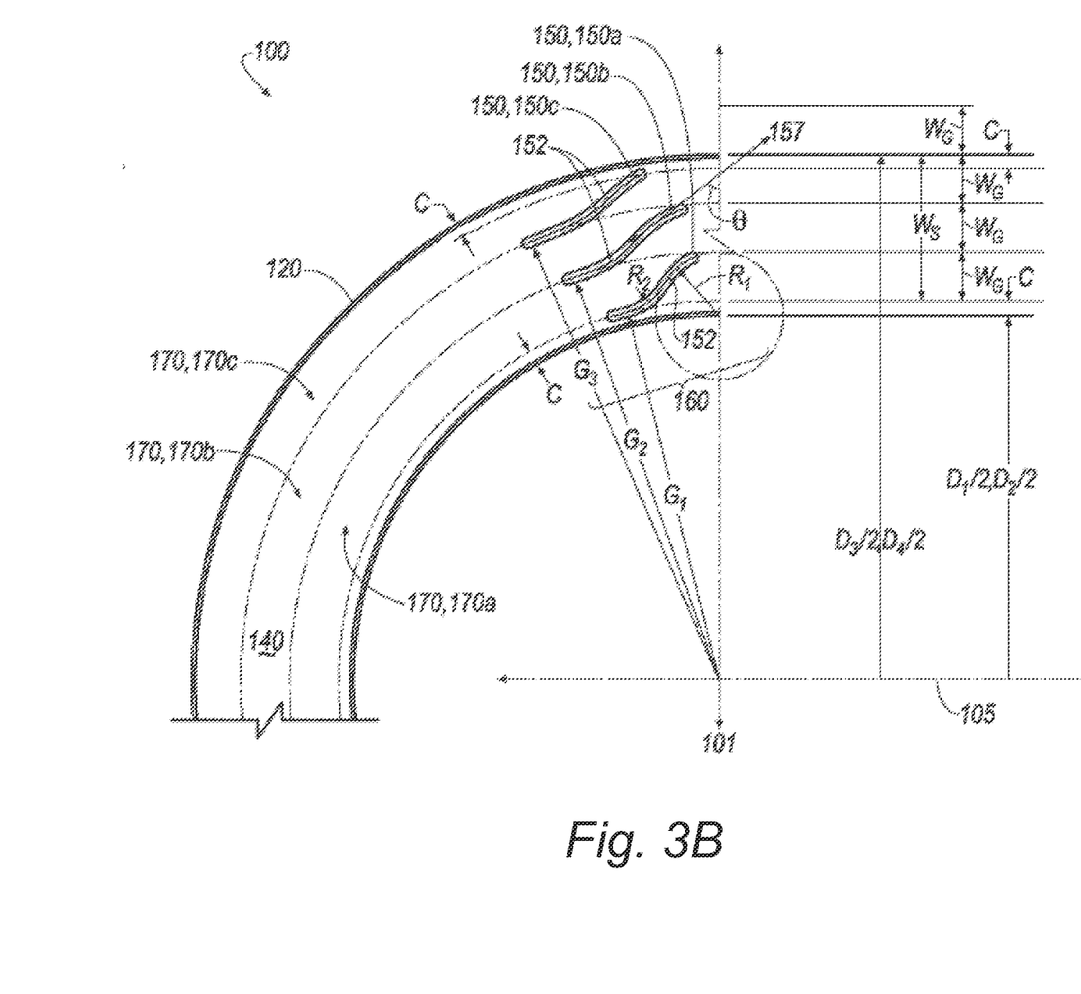
FIG. 3B is a partial bottom view of the brake rotor shown in FIG. 3A along line 3B-3B.
Figure 4:
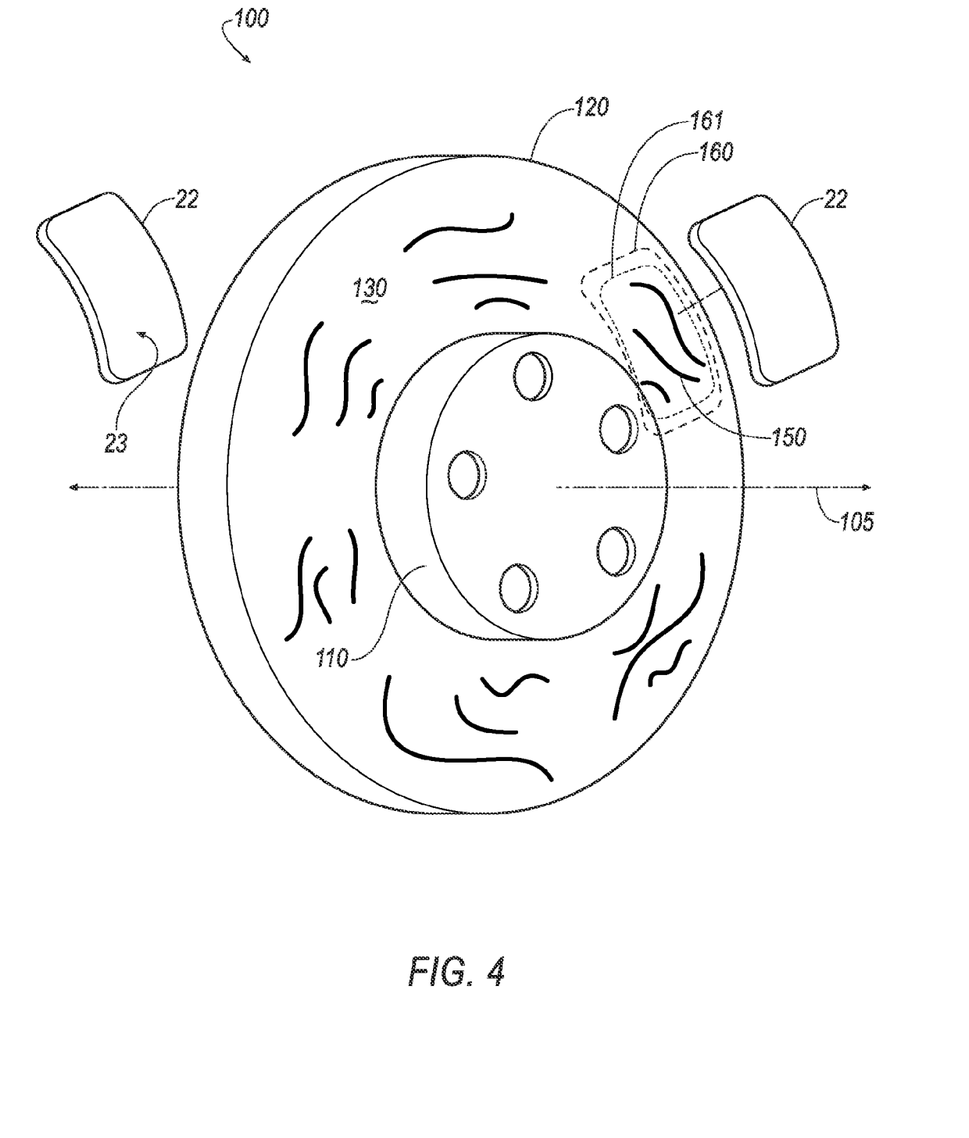
FIG. 4 is a perspective view of an exemplary brake rotor receiving brake pads.

Referring to FIG. 4, in some implementations, at least one brake pad receiving surface 130, 140 defines non-intersecting asymmetrical grooves 150 arranged asymmetrically with respect to each other. For example, each groove 150 can be arranged such that any line tangent 157 to the grove path 152 is at a different angle θ and/or distance from a longitudinal axis 101, a transverse axis 103, a center axis of rotation 105, any plane formed between the axes 101, 103, 105, and/or any other reference or datum with respect to the brake rotor 100. Moreover, each groove 150 can have a different geometry than every other groove 150. Each groove 150 may extend without a break in continuity having continuous walls that define the groove 150. Having non-intersecting grooves 150 allows for asymmetrical and/or random placement of the grooves 150 on the brake pad receiving surface 130, 140. For example, each groove 150 can be located without any pattern, such that the occurrence of one groove 150 in any given location at least one brake pad receiving surface 130, 140 has an equal probability of occurrence in another location on the at least one brake pad receiving surface 130, 140. A non-directional ripple style arrangement of grooves 150 (i.e., not necessarily systematically aligned or spaced with any predetermined reference, such as an axis or plan, or datum, such as a geometrical constraint or size, of the brake rotor 100) improves pad wear (i.e., less pad wear over time) as compared to rotors without such an arrangement of grooves. Moreover, in some implementations, each groove 150 has a non-linear groove path 152, as illustrated in FIG. 3B. Each groove path 152 may have first and second radii of curvature, $R_1$ and $R_2$, for corresponding first and second curves along the respective brake pad receiving surface 130, 140. The first and second radii of curvature $R_1, R_2$ can be equal or different. The curved groove paths 152 decrease brake pad wear relative to brake rotors without such grooves 150.

In some implementations, at least one brake pad receiving surface 130, 140 defines groups 160 of non-intersecting asymmetrical grooves 150. Each groove 150 of the groove group 160 has a respectively associated groove path 152 along the respective brake pad receiving surface 130, 140 different from any other groove 150 within the respectively associated groove group 160. Each groove group 160 may be arranged asymmetrically circumferentially about the respective brake pad receiving surface 130, 140. The asymmetrical grooves 150 and/or the asymmetrical arrangement of groove groups 160 about the brake pad receiving surface 130, 140 aids uniform wearing of the brake pad receiving surface 130, 140 over time and allows installation of the brake rotor 100 equally on right and left sides of the vehicle 10. Moreover, in some implementations, at least one groove group 160 can define a collective area 161 on the respective brake pad receiving surface 130, 140 around the constituent grooves 150 that has an area less than or equal to an engagement surface area 23 of a received brake pad 22, as shown in FIG. 4. Moreover, the collective area 161 may define a shape the same as or substantially similar to the engagement surface area 23 of the received brake pad 22. This helps maximize groove contact with a received brake pad 22 for out-gassing of friction volatiles.

Referring again to FIGS. 3A and 3B, in some implementations, each groove group 160 has one or more grooves 150 disposed in one or more groove regions 170 that encircle a mounting bell 110. For example, each groove group 160 can include first, second, and third grooves 150a, 150b, 150c. Each groove 150a, 150b, 150c resides in respective first, second, and third groove regions 170a, 170b, 170c of the brake pad receiving surface 130, 140. The groove regions 170a, 170b, 170c are arranged circumferentially about a center axis 105 which corresponds to the center of rotation of the brake rotor 100 when installed and functioning on a vehicle 10. In some examples, each groove region 170a, 170b, 170c has a radial width $W_G$ of about ⅓ of a radial width $W_S$ of the respective brake pad receiving surface 130, 140.

The first and second brake receiving surfaces 130, 140 each have inner diameters $D_1$, $D_2$ and outer diameters $D_3$, $D_4$ with respect to the center axis of rotation 105 of the brake rotor 100. In some implementations, each groove path 152 extends along its respective brake pad receiving surface 130, 140 at a radial groove distance G (e.g., $G_1$, $G_2$, $G_3$ for each respective groove 150a, 150b, 150c) from the center axis 105 greater than or equal to one half of the inner diameter $D_1$, $D_2$ of the brake receiving surface 130, 140 having the largest inner diameter $D_1$, $D_2$ among the two brake receiving surfaces 130, 140, plus a clearance distance C. This relationship is illustrated in equation 1, using a condition operator.

$$G \geq (½(\text{IF } D_1 > D_2 \text{ THEN } D_1, \text{ ELSE } D_2)) + C \quad (1)$$

In some examples, the clearance distance C is about 0.18 inch and the mounting bell 110 has a height $H_B$ of less than or equal to 3 inches. The mounting bell height $H_B$ is measured as the overall height $H_{All}$ of the brake rotor 100 minus the overall thickness T of the braking band 120. In other examples, the clearance distance C is about 0.21 inch and the mounting bell 110 has a height $H_B$ greater than 3 inches.

The groove distance G may vary radially from a first end of a groove 150 to an opposite, second end of the groove 150. The groove distance G, in some implementations, is equal to the greater of (a) one half of the inner diameter $D_1$, $D_2$ of one of the brake receiving surfaces 130, 140 (such as the largest inner diameter $D_1$, $D_2$), plus the clearance distance C, and (b) a radius $R_B$ of the mounting bell 110 plus a threshold distance M. The threshold distance M can be a minimum clearance distance between a groove 150 and the mounting bell 110. For example, the threshold distance M can be equal or greater than a tooling clearance in manufacturing the brake rotor 100. This relationship is illustrated in equation 2, using a condition operator.

$$G \geq (\text{IF } a > b \text{ THEN } a, \text{ ELSE } b) \quad (2)$$

where $a = (½(\text{IF } D_1 > D_2, \text{ THEN } D_1, \text{ ELSE } D_2)) + C$ and $b = R_B + M$.

In some examples, the clearance distance C is about 0.18 inch, the threshold distance M is about 0.27 inch, and the mounting bell height $H_B$ is less than or equal to 3 inches. In other examples, the clearance distance C is about 0.21 inch, the threshold distance M is about 0.35 inch, and the mounting bell height H is greater than 3 inches.

In yet further examples, each groove path 152 can extend along its respective brake pad receiving surface 130, 140 at the threshold groove distance G (e.g., $G_1$, $G_2$, $G_3$ for each respective groove 150a, 150b, 150c) from the center axis 105 that is greater than or equal to the mounting bell radius $R_B$ plus the threshold distance M. The threshold distance M can be about 0.27 inch for a mounting bell height $H_B$ of less than or equal to 3 inches or the threshold distance M can be about 0.35 inch for a mounting bell height $H_B$ greater than 3 inches.

A number of implementations have been described. Nevertheless, it will be understood that various modifications may be made without departing from the spirit and scope of the disclosure. Accordingly, other implementations are within the scope of the following claims.

What is claimed is:

1. A brake rotor comprising:
   a rotor support; and
   a braking band disposed on and encircling the rotor support, the braking band having first and second brake pad receiving surfaces on opposite sides of the braking band, with at least one brake pad receiving surface defining a plurality of non-intersecting curvilinear asymmetrical grooves having groove paths extending along the at least one brake pad receiving surface,
   wherein the grooves are disposed in groove regions of concentric rings each having inner and outer circumferences with the groove regions arranged circumferentially about a center axis corresponding to the center of rotation of the brake rotor when installed and functioning on a vehicle,
   wherein each groove region contains one or more grooves but no grooves extend from the inner circumference of an inner groove region ring to the outer circumference of an outer groove region ring,
   wherein the non-intersecting curvilinear asymmetrical grooves are arranged in groove groups comprising three grooves, with each groove of a respective groove group having a groove path that is different from any other groove of the respective groove group, and with each groove having a different geometry than every other groove on the at least one brake pad receiving surface irrespective of any groove groups.

2. The brake rotor of claim 1, wherein three concentric rings are provided corresponding to innermost, central and outermost groove regions wherein no grooves extend from the inner circumference of the innermost groove region ring to the outer circumference of the central groove region ring, and no grooves extend from the inner circumference of the central groove region ring to the outer circumference of the outermost groove region ring.

3. The brake rotor of claim 2, wherein each groove group comprises first, second, and third grooves disposed in the innermost, central and outermost groove regions, respectively.

4. The brake rotor of claim 1, wherein each groove group is sized to reside completely within a perimeter of an engagement surface of a received brake pad.

5. The brake rotor of claim 1, wherein the groove groups are spaced from each other along the circumference of the at least one brake pad receiving surface.

6. The brake rotor of claim 1, wherein at least 8 groove groups are provided on the at least one brake pad receiving surface.

7. The brake rotor of claim 1, wherein at least some of the grooves have variable depths with respect to the at least one brake pad receiving surface.

8. The brake rotor of claim 1, wherein each groove in a groove group covers about ⅓ of a radial width of the at least one brake pad receiving surface.

9. The brake rotor of claim 1, wherein at least one groove defines a bull-nose shape in cross-section.

10. The brake rotor of claim 1, wherein the braking band is defined by a thickness dimension, wherein each groove is defined by a depth dimension, wherein the depth dimension is less than the thickness dimension.

11. The brake rotor of claim 1, wherein the braking band is directly connected to and extends radially outwardly from the rotor support.

12. The brake rotor of claim 1, wherein each groove is defined by a proximal end wall, a distal end wall, a first side wall and a second side wall, wherein the proximal end wall substantially directly opposes the distal end wall, wherein the first side wall substantially directly opposes the second side wall.

13. A brake rotor comprising:
a rotor support; and
a braking band disposed on and encircling the rotor support, the braking band having first and second brake pad receiving surfaces on opposite sides of the braking band, at least one brake pad receiving surface defining groups comprising three non-intersecting asymmetrical grooves, each groove of each groove group having a groove path along the at least one brake pad receiving surface that is different from any other groove of the respective groove group and each groove of the respective groove group having a different geometry than every other groove on the receiving surface irrespective of any groove groups, and arranged asymmetrically with respect to each other groove in the group;
wherein the grooves are disposed in groove regions of concentric rings each having inner and outer circumferences with the groove regions arranged circumferentially about a center axis corresponding to the center of rotation of the brake rotor when installed and functioning on a vehicle,
wherein each groove region contains one or more grooves of the groove groups but no grooves extend from the inner circumference of an inner groove region ring to the outer circumference of an outer groove region ring,
wherein the groove groups are spaced from each other along the circumference of the at least one brake pad receiving surface.

14. The brake rotor of claim 13, wherein each groove group is sized to reside completely within a perimeter of an engagement surface of a received brake pad.

15. The brake rotor of claim 13, wherein each groove of a group of grooves is intersected by a common radial line extending from the center axis of the rotor.

16. The brake rotor of claim 13, wherein at least some of the grooves have variable depths with respect to the at least one brake pad receiving surface.

17. The brake rotor of claim 13, wherein each groove path has first and second radii of curvature for first and second curves of the groove along the at least one brake pad receiving surface.

18. The brake rotor of claim 13, wherein each groove in a groove group covers about ⅓ of a radial width of the at least one brake pad receiving surface.

19. The brake rotor of claim 13, wherein at least one groove defines a bull-nose shape in cross-section.

20. The brake rotor of claim 13, wherein the braking band is defined by a thickness dimension, wherein each groove is defined by a depth dimension, wherein the depth dimension is less than the thickness dimension.

21. The brake rotor of claim 13, wherein the braking band is directly connected to and extends radially outwardly from the rotor support.

22. The brake rotor of claim 13, wherein each groove is defined by a proximal end wall, a distal end wall, a first side wall and a second side wall, wherein the proximal end wall substantially directly opposes the distal end wall, wherein the first side wall substantially directly opposes the second side wall.

23. A brake rotor comprising:
a rotor support; and
a braking band disposed on and encircling the rotor support, the braking band having first and second brake pad receiving surfaces on opposite sides of the braking band, with at least one brake pad receiving surface defining a plurality of non-intersecting curvilinear asymmetrical grooves having groove paths extending along the at least one brake pad receiving surface,
wherein the grooves are disposed in groove regions of concentric rings each having inner and outer circumferences with the groove regions arranged circumferentially about a center axis corresponding to the center of rotation of the brake rotor when installed and functioning on a vehicle,
wherein the non-intersecting curvilinear asymmetrical grooves are arranged in groove groups comprising three grooves, with each groove of a respective groove group having a groove path that is different from any other groove of the respective groove group, and
wherein each groove has a different geometry than every other groove on the at least one receiving surface irrespective of the groove groups.

24. The brake rotor of claim 23, wherein each groove group is sized to reside completely within a perimeter of an engagement surface of a received brake pad.

25. The brake rotor of claim 23, wherein each groove in a groove group covers about ⅓ of a radial width of the at least one brake pad receiving surface.

26. The brake rotor of claim 23, wherein at least one groove defines a bull-nose shape in cross-section.

27. The brake rotor of claim 23, wherein the braking band is defined by a thickness dimension, wherein each groove is defined by a depth dimension, wherein the depth dimension is less than the thickness dimension.

28. The brake rotor of claim 23, wherein the braking band is directly connected to and extends radially outwardly from the rotor support.

29. The brake rotor of claim 23, wherein each groove is defined by a proximal end wall, a distal end wall, a first side wall and a second side wall, wherein the proximal end wall substantially directly opposes the distal end wall, wherein the first side wall substantially directly opposes the second side wall.

30. The brake rotor of claim 23, wherein no groove extends from the inner circumference of an inner groove region ring to the outer circumference of an outer groove region ring.

31. The brake rotor of claim 23, wherein the groove groups are spaced from each other along the circumference of the at least one brake pad receiving surface.

32. The brake rotor of claim 23, wherein at least 8 groove groups are provided on the at least one brake pad receiving surface.

33. A brake rotor comprising:

a rotor support; and a braking band disposed on and encircling the rotor support, the braking band having first and second brake pad receiving surfaces on opposite sides of the braking band, with at least one brake pad receiving surface defining a plurality of non-intersecting curvilinear asymmetrical grooves having groove paths extending along the at least one brake pad receiving surface, wherein the non-intersecting curvilinear asymmetrical grooves are arranged in groove groups of three grooves, with each groove of a respective groove group having a groove path that is different from any other groove of the respective groove group, and with each groove having a different geometry than every other groove on the at least one brake pad receiving surface irrespective of any groove groups.

34. A brake rotor comprising:

a rotor support; and a braking band disposed on and encircling the rotor support, the braking band having first and second brake pad receiving surfaces on opposite sides of the braking band, at least one brake pad receiving surface defining groups comprising three non-intersecting asymmetrical grooves, each groove of each groove group having a groove path along the at least one brake pad receiving surface that is different from any other groove of the respective groove group and each groove of the respective groove group having a different geometry than every other groove on the at least one brake pad receiving surface irrespective of any groove groups, and arranged asymmetrically with respect to each other groove in the group;

wherein the groove groups are spaced from each other along the circumference of the at least one brake pad receiving surface.

* * * * *